United States Patent [19]

Lowe

[11] Patent Number: 4,838,505

[45] Date of Patent: Jun. 13, 1989

[54] REMOTE CONTROL HOLDER

[76] Inventor: Terry J. Lowe, Rte. 2, Box 475A, Virginia Ave., Goodlettesville, Tenn. 37072

[21] Appl. No.: 151,614

[22] Filed: Feb. 2, 1988

[51] Int. Cl.[4] .............................................. F16M 11/00

[52] U.S. Cl. ..................................................... 248/176

[58] Field of Search ........................ 248/176, 177, 127; 273/148 B; 220/85 H

[56] References Cited

U.S. PATENT DOCUMENTS 4,660,792 4/1987 Rogalski ................................ 248/174

4,712,693 12/1987 Striplin ............................ 248/185 X

*Primary Examiner*—Ramon O. Ramirez

*Attorney, Agent, or Firm*—Stephen T. Belsheim

[57] ABSTRACT

A portable device used to retain and consolidate multiple remote controls of home electronic entertainment devices, having a means which enables the user to operate a single remote control while it and the other remote controls are attached to said portable device. Also, comprising a means of attaching or detaching the remote controls from the portable device.

15 Claims, 2 Drawing Sheets

REMOTE CONTROL HOLDER

BACKGROUND OF THE INVENTION

1. Field of the Invention

This invention relates to remote controls of home electronic entertainment devices, specifically to a portable hand held structure which will retain and consolidate them.

2. Discussion of Prior Art

Heretofore, there has been no portable hand held structure for the retaining of remote controls.

SUMMARY OF THE INVENTION

Accordingly several objects of my invention are, that the remote control holder consolidates home use remote controls to provide ease in locating them as well as using them. It comprises a means for attaching the remote controls to the remote control holder, such that a single unit is formed holding multiple remote controls.

It is an object of this invention to provide a convenient and easy means to retain, consolidate and use multiple remote controls individually but on a single structure, which is lightweight and inexpensive to manufacture.

Further objects and advantages of my invention will become apparent from a consideration of the drawings and ensuing description thereof.

DESCRIPTION OF THE PREFERRED EMBODIMENT

Figure 1:
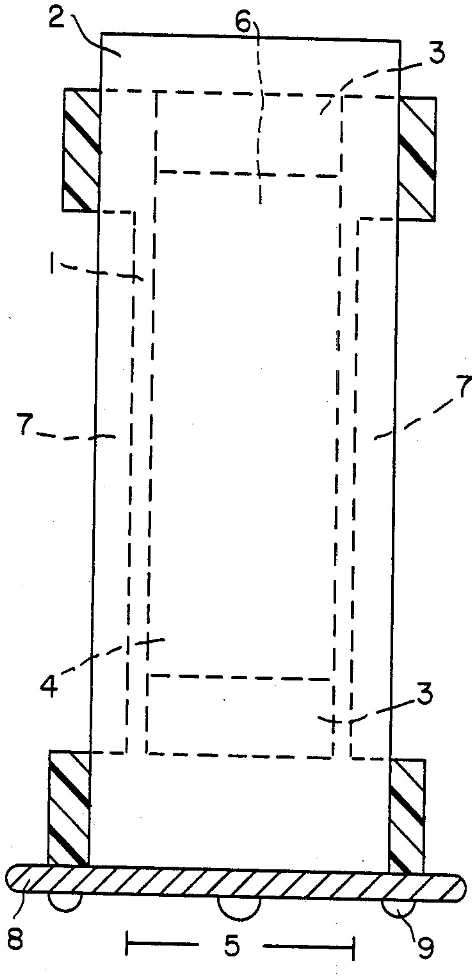
FIG. 1 is a plan view showing an embodiment of the remote control holder, which will retain two remote conrols.
Figure 2:
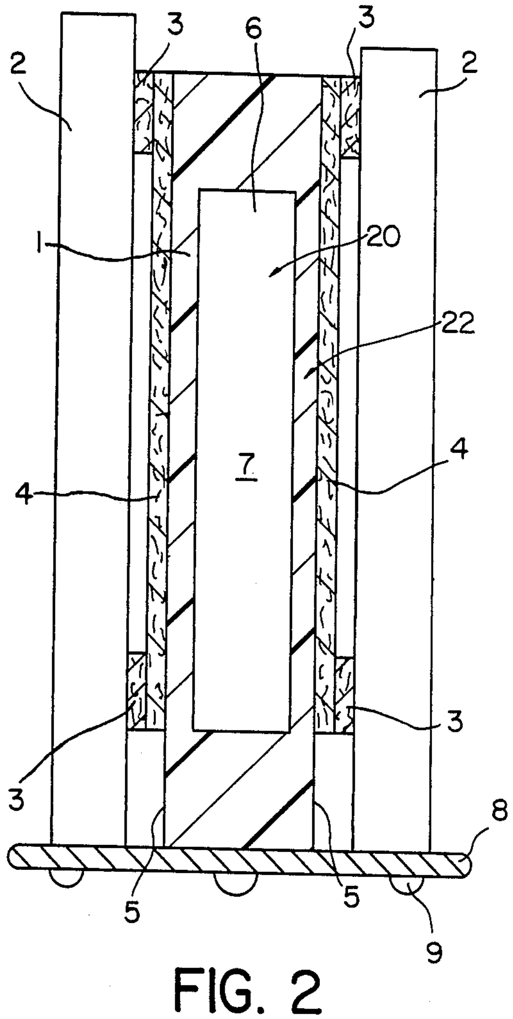
FIG. 2 is a side view of the embodiment of the remote control holder, which will retain two remote controls.
Figure 3:
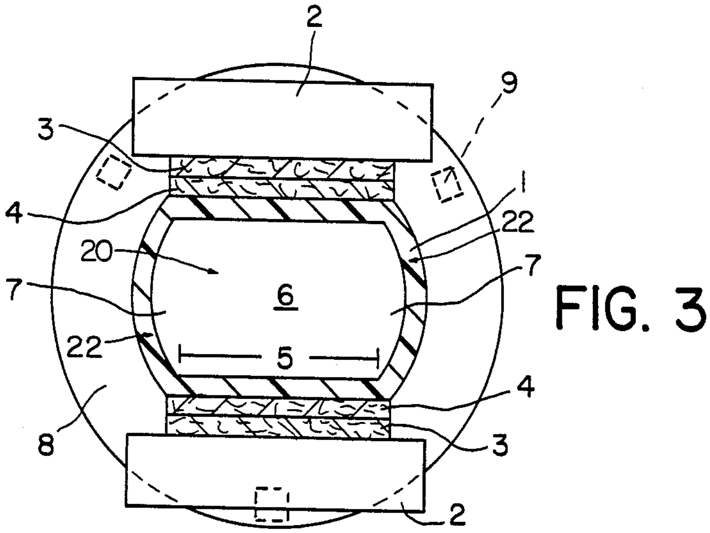
FIG. 3 is an elevated view of the embodiment of the remote control holder which will retain two remote controls.

Referring to FIGS. 1,2,3,4, and 4, an embodiment of the invention is shown in which the remote controls 2, is attached to the remote control holder 1.

The attaching means of the remote control 2, to the remote control holder 1, is accomplished by the use of VELCRO loop tape 3, which is to be placed on the back side of remote control 2, by the individual, and the VELCRO hook tape 4, which is attached to the widest horizontal portions 5, of the face of the remote control holder 1, placed by the manufacturer.

An opening 6, at the top of the remote control holder 1, extending through the center to the base 8, is a storage means for an entertainment program guide.

Figure 4:
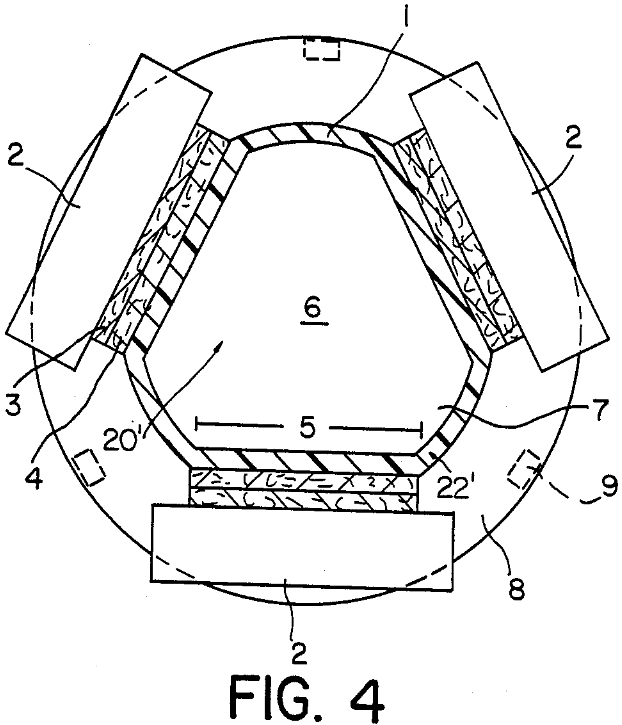
FIG. 4 is an elevated view of the embodiment of the remote control holder, which will retain three remote controls.
Figure 5:
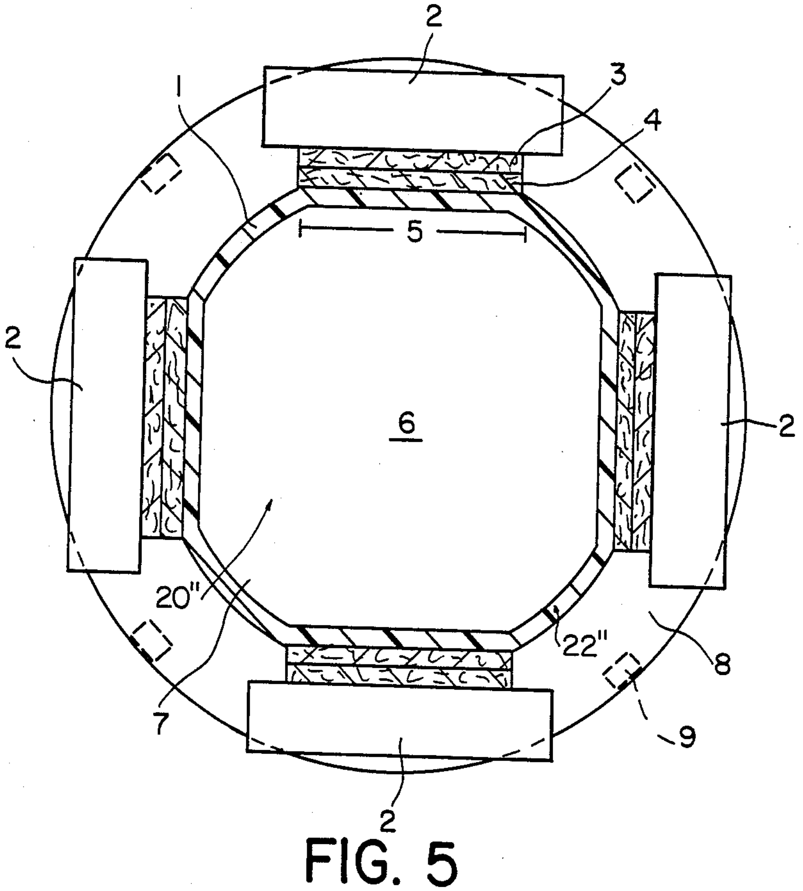
FIG. 5 is an elevated view of the embodiment of the remote control holder, which will retain four remote controls.

This storage means, generally designated as 20, is defined by the base 8 and a plurality of upstanding walls 22. In FIG. 4, the storage means is identified by reference numeral 20' and the upstanding walls are identified by reference numeral 22. In FIG. 5, the storage means is identified by reference numeral 20'' and the upstanding walls are identified by reference numeral 22''.

Openings 7, at each side of the widest horizontal portions 5, of the remote control holder 1, are means for grasping remote control 2, and remote control holder 1, simultaneously.

The remote control holder 1, is supported by a circular base 8, with which would be attached non-skid material 9, by the manufacturer.

OPERATION

The function of the remote control holder 1, is to retain the remote controls 2. Remote control holder 1, provides ease in locating remote controls 2, as well as using them, in that the remote controls 2, are in a central location which is portable and allows a means for using one remote control 2, while the others are atached as well.

The attaching means of remote controls 2, to remote control holder 1, is accomplished by installing two strips of VELCRO loop tape 3, to the backside of the remote control 2; one at the top and one at the bottom just above the battery replacement cover. Next, press the back of the remote control 2, to the widest verticle portion 5, of the remote control holder 1, which would have attached manufacturer placed VELCRO hook tape 4. The function of the attaching mean, VELCRO loop tape 3, and velcro hook tape 4, is to retain remote controls 2, to remote control holder 1, providing a securing means for remote controls 2, while an individual remote control 2, is being used; and to provide a detaching means so battery replacement of remote controls 2, is made possible.

The function of openings 7, which are located at each side of the widest horizontal portions 5, of the remote control holder 1, provide a means of grasping and lifting remote control 2, to be used and remote control holder 1, simultaneously with remote controls 2, which are not to be used. Operation is accomplished by placing your hand in openings 7, grasping individual remote control 2, and remote control holder 1, lifting and pointing them in the direction of the entertainment device to be operated and pressing desired functions, which is the best mode of operation, in my opinion.

The remote control holder 1, having a circular base 8, provids the function of maintaining verticle stability of remote control holder 1.

Finally, the non-skid material 9, placed by the manufacturer on the bottom of the circular base 8, is to provide horizontal stability of remote control holder 1.

The process of making the remote control holder 1, is accomplished by drafting the design of the remote control holder 1, on sheet plastic, such as acrylic; cutting the design out, and placing it over a heating element. When pliable, the plastic is bent around a mold to produce the desired shape. Seams are then butted and glued. Then, VELCRO hook tape 4, and non-skid material 9, are attached to remote control holder 1, by an adhesive. Another means of making this remote control holder 1, is by injection molding.

I claim:

1. A holder for holding one or more remote controllers for remotely controlling one or more corresponding electronic devices comprising:

a base;

a plurality of upstanding walls extending upwardly from said base, each of said walls presenting an outwardly facing surface and an inwardly facing surface;

a means, mounted to selected ones of said outwardly facing surfaces, for facilitating the releasable attachment of each one of the remote controllers to its coresponding said outwardly facing surface;

said upstanding walls and said base defining a storage volume therein; and said upstanding walls present two generally flat surfaces to which said attachment means is mounted and each one of said flat surfaces contains an aperture by which the holder may be grasped.

2. The holder of claim 1 wherein said upstanding walls are perpendicularly disposed with respect to said base.

3. The holder of claim 1 wherein said flat surfaces are joined by a pair of intermediate members so that said flat surfaces are spaced apart and oppositely disposed from each other.

4. The holder of claim 1 further including a means, contained within said walls, for positioning the holder.

5. The holder of claim 4 wherein said positioning means includes an aperture contained within said walls.

6. The holder of claim 1 wherein said base is circularly shaped.

7. The holder of claim 1 wherein said upstanding walls present three generally flat surfaces to which said attachment means is mounted.

8. The holder of claim 7 where said flat surfaces are joined by a plurality of intermediate members so that said flat surfaces are spaced apart.

9. The holder of claim 8 wherein each one of said intermediate members contains an aperture through which the holder may be positioned.

10. The holder of claim 1 wherein said upstanding walls present four generally flat surfaces to which said attachment means is mounted.

11. The holder of claim 10 wherein said generally flat surfaces are joined by a plurality of intermediate members so that the flat surfaces are spaced apart.

12. The holder of claim 11 wherein each one of said intermediate members contains an aperture therein through which the holder may be positioned.

13. A holder for releasably supporting one up to a preselected number of remote control devices for controlling one or more electronic devices comprising:

a generally horizontally disposed base having top and bottom surfaces, the bottom surface designed to rest upon a generally flat supporting surface;

a plurality of generally vertically disposed walls extending upwardly from the top surface of said base, each one of said walls being joined to its adjacent walls;

means, mounted to each upstanding wall, for attaching a remote control device to the holder;

said vertically disposed walls and said top surface of said base defining a storage volume, said storage volume being suitable for receiving and storing a magazine; and an opening contained in at least one of said vertically disposed walls whereby the holder can be grasped by said opening.

14. The holder of claim 13 further including a means, contained within said walls, for positioning the holder.

15. A holder for releasably supporting a preselected number of remote control devices comprising:

a base presenting a surface;

a generally perpendicular disposed wall extends from the surface of said base;

a means mounted to the wall, for releasably attaching the remote control devices to the holder;

the wall containing an aperture whereby the holder can be grasped for positioning the holder; and a storage volume defined by the surface of said base and said wall whereby items can be stored therein.

* * * * *